United States Patent [19]

Jamieson

[11] Patent Number: 4,748,339
[45] Date of Patent: May 31, 1988

[54] WIND TURBINE OPERATED ELECTRICAL GENERATOR SYSTEM

[75] Inventor: Peter M. Jamieson, Stirling, Scotland

[73] Assignee: James Howden & Company Limited, Glasgow, Scotland

[21] Appl. No.: 45,803

[22] Filed: Apr. 27, 1987

Related U.S. Application Data

[63] Continuation of Ser. No. 713,426, Mar. 19, 1985, abandoned.

[30] Foreign Application Priority Data

Mar. 21, 1984 [GB] United Kingdom ................ 8407332

[51] Int. Cl.[4] ............................................. F03D 7/04
[52] U.S. Cl. ........................................ 290/55; 290/44
[58] Field of Search ...................... 290/55, 44; 416/89, 416/88, 87

[56] References Cited

U.S. PATENT DOCUMENTS 2,074,149  3/1937  Jacobs .................................. 416/88
2,282,077  5/1942  Moore .................................. 416/89
4,374,631  2/1983  Barnes .............................. 416/89 A

FOREIGN PATENT DOCUMENTS 2346912  9/1973  Fed. Rep. of Germany ........ 416/89

Primary Examiner—Bernard Roskoski
Attorney, Agent, or Firm—Barnes & Thornburg

[57] ABSTRACT

A wind turbine operated electrical generator system, said system comprising a wind turbine of the axial flow type, the blades of the turbine including tip portions pivoted with respect to the remainder of the blade, a generator driven by the wind turbine and designed to operate within a given rotational speed range, said speed range being below the speed at which the wind turbine can develop its maximum power, a pin and socket connection on the outer end of at least some of said blades, and preferably each blade, for connecting the tip thereto and a cam track on the pin or socket, with a follower on the socket or pin, respectively, the cam track being shaped to cause the tip to pivot under centrifugal movement of the tip, so that a change in the torque produced by the pivoting at all times maintains the speed substantially within said given range, resilient means being provided to restore the position of the or each tip against centrifugal action.

6 Claims, 2 Drawing Sheets

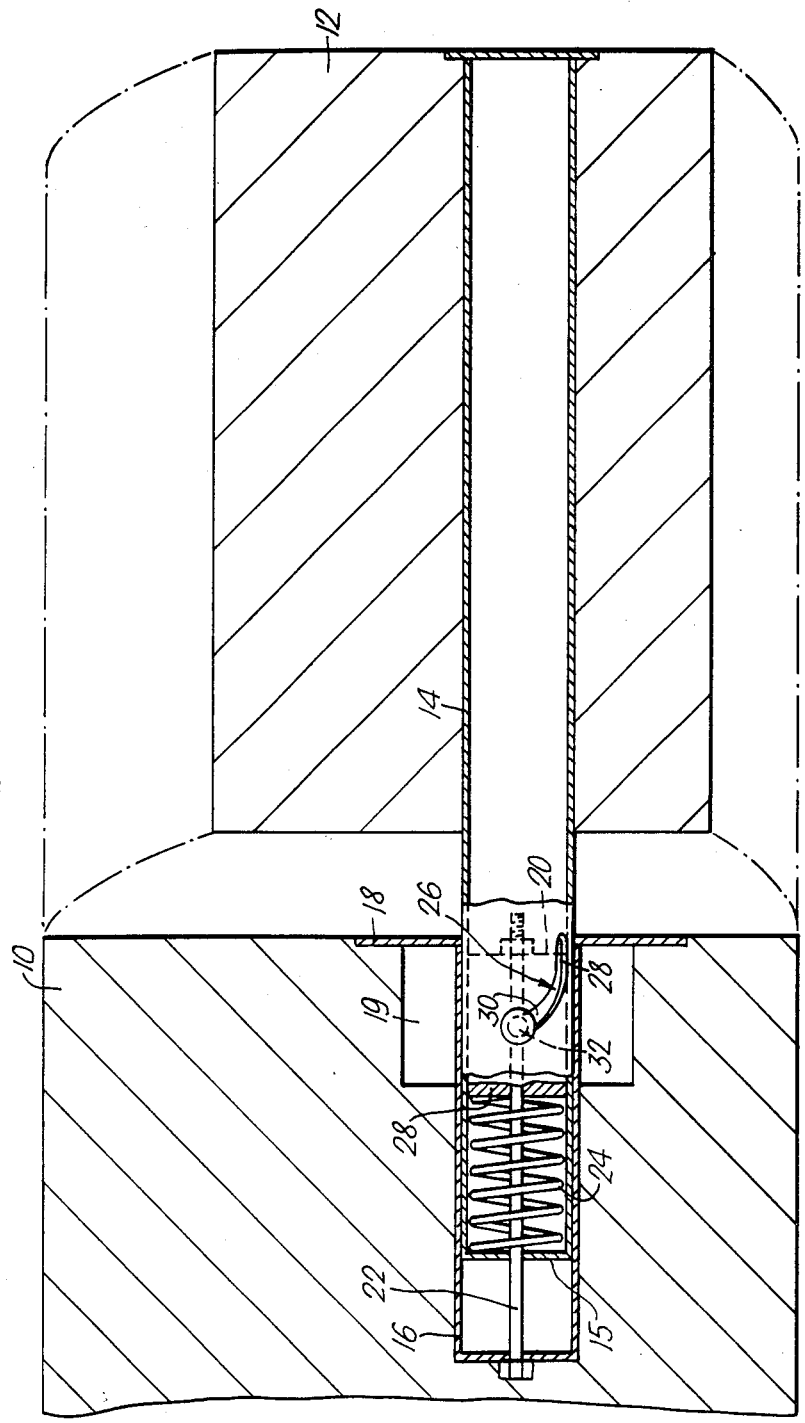

WIND TURBINE OPERATED ELECTRICAL GENERATOR SYSTEM

This is a file wrapper continuation, of application Ser. No. 713,426, filed Mar. 19, 1985 now abandoned.

The present invention relates to a wind turbine operated electrical generator system.

The use of wind turbines for generating electricity has taken place for many years and the generator itself is required to produce power which is synchronized to an electrical grid system, so that the grid constrains the machine to run at essentially a constant speed, that is with a variation of, at the very most, 5% depending on the type of electrical generator used.

For a certain range of wind speeds, torques due to the wind acting on the rotor will not be excessive and the system can operate perfectly satisfactory without there being any essential need for any control of rotor power, e.g. by change of the blade angle, by use of movable tips or of spoilers or the like.

However, at higher wind speeds, the rotor torque which is produced by the wind acting on the turbine would often be enough to cause the system to operate out of synchronization and some method of controlling the torque of the rotor is essential.

Most commercially operable wind turbines have fixed blades and have various systems for controlling the speed and for controlling the torque generated by the rotor. These systems fall into the following categories:

(a) design of the rotor aerofoil sections and blade geometry to produce a construction where the efficiency of the rotor falls rapidly as the wind speed increases. With such a construction there are no additional mechanical or movable parts associated with the fixed blades and such a system is often termed "stall regulation" since the loss of efficiency is achieved by designing the aerofoils so that they become stalled at high wind speeds.

(b) by the use of movable parts on the blades of the turbine, e.g. spoilers, ailerons or rotatable tips which act to reduce the rotor torque as required. Two classes of device are used:

1. Active

Such an active system produces a feedback from the rotatable speed of the shaft or from the generator output and this is used to activate a system to operate the aerodynamic devices. These may be electrical, mechanical, hydraulic or a combination of these and will cause, for example, the tips to rotate in response to a signal from a governor on the rotor shaft or where the generator produces power beyond a certain level. Such devices are relatively complex and expensive to manufacture.

2. Passive

Passive devices use centrifugal force or the force of the wind to regulate the degree of rotation of the spoilers, ailerons or tips. The most commonly used is one where the operation is by centrifugal force and the blades and tips are connected by a pin and socket connection on the outer end of each blade and a helical cam track is provided on the pin or socket and a follower is provided on the socket or pin respectively so that centrifugal force urges the tip outwardly against the action of a spring. As the speed increases beyond a safe value, the tip is caused to rotate to prevent any excessive speed.

With regard to the operation referred to under paragraph (a), that is by choosing the appropriate aerofoil section, there must still be a protection arrangement, probably an aerodynamic brake, which can be used in the event of failure of the grid or generator, because the stall regulation of the rotor torque only works provided the speed is itself controlled. A typical protection is to have blade tips which act in the way described in the preceding paragraph and at normal operating speed, the outward centrifugal force is overcome by a spring force, but at, say, 20% overspeed, the centrifugal force will exceed the spring force and will then operate the pivoting of the blade tips. Such an arrangement is used to prevent overspeed in the failure condition.

It is now proposed, according to the present invention, to provide a wind turbine operated electrical generator system, said system comprising a wind turbine of the axial flow type, the blades of the turbine including tip portions pivoted with respect to the remainder of the blade, a generator driven by the wind turbine and designed to operate within a given rotational speed range, said speed range being below the speed at which the wind turbine can develope its maximum power, a pin and socket connection on the outer end of at least some, and preferably each blade, for connecting the tip thereto and a cam track on the pin or socket, with a follower on the socket or pin, respectively, the cam track being shaped to cause the tip to pivot under centrifugal movement of the tip, so that a change in the torque produced by the pivoting at all times maintains the speed substantially within said given range, resilient means being provided to restore the position of the or each tip against centrifugal action.

Such a construction will employ a cam track in which the follower moves which is not purely helical, but of a predetermined shape which is related to the blade tip aerofoil characteristics, so that a suitable opposing torque may be produced to effect control at each level of high wind. Thus, the operation of the blade tip is controlled by opposing centrifugal and spring forces, but without active control.

Preferably, the first part of the track in which the follower moves is relatively straight, that is extends in a direction generally radial of the axis of rotation, so that the tip can move out easily without any twisting, in response to wind gusts. This outward movement will increase the moment of inertia of the rotor and this will have an initial effect of reducing the speed and subsequently to restore it. If the gust should persist, or the wind speed should generally increase, the tips will be caused to turn by the follower reaching a part of the cam track which is curved. This will have the effect of reducing the efficiency of the rotor and thereby reducing the torque. When the speed drops again, the action of the spring will restore the rotational position of the tip and as the speed drops still further the tip can move radially inwardly and thereby again reducing the moment of inertia. Such an arrangement will ensure a significant control of the operation of the wind turbine and it can be preferably caused to maintain the speed within 5% of its design speed.

In order that the centrifugal force may be used satisfactorily to operate differentially, to provide the variations for control, some variation in the rotor speed must be allowed, this can be done from the generator design or otherwise. For example, one can use an induction generator which can tolerate up to 5% slip. One could alternatively, or additionally, use a fluid coupling. The requirement for some speed variation is essential to the operation of the system. Whilst a fluid coupling will add to the cost, it will also produce further smoothing of the output power and allow a system which can be significantly cheaper than one with actively controlled blade tips.

It will be appreciated that with the arrangement of the present invention, one is able to produce a control of the system rather than simply a protection of the system. Instead of the relation between outward motion and turning motion of the tip being purely linear, and the path described being a helix, a path will be used which enables the angular position of the blade to suit the particular requirements of torque control which are necessary for that particular aerofoil cross-section. Since the centrifugal force action depends on some variation in speed, slip must be introduced into the system and one can use, for example, the induction motor with or without the addition of the fluid coupling mentioned above.

In order that the present invention may more readily be understood, the following description is given, merely by way of example, reference being made to the accompanying drawings, in which:

FIG. 4 is a schematic cross-section through one embodiment of blade tip assembly used in a wind turbine generator system according to the invention.

Figure 1:
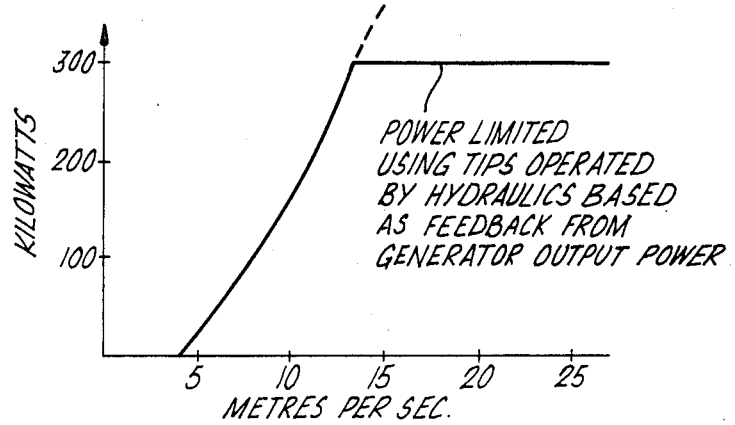
FIG. 1 is a graph showing the output characteristics of a known form of wind turbine generator system employing an active hydraulic feed back to control blade tips.

Referring first to FIG. 1, there is illustrated a graph having the abscissa indicating wind speed in meters per second and the ordinate indicating power in kilowatts. It will be seen that as the speed increases, the power does also until it reaches approximately 400 to 500 kilowatts whereafter the speed begins to tail off at a wind speed of approximately 20 meters per second. Using a hydraulically operated tip control arrangement designed to be controlled as a feed back from the generator output power, the output is limited to a threshold value of 300 kilowatts above a speed of approximately 12 to 15 meters per second. The control arrangement is really quite expensive and adds to the overall cost of the system.

Figure 2:
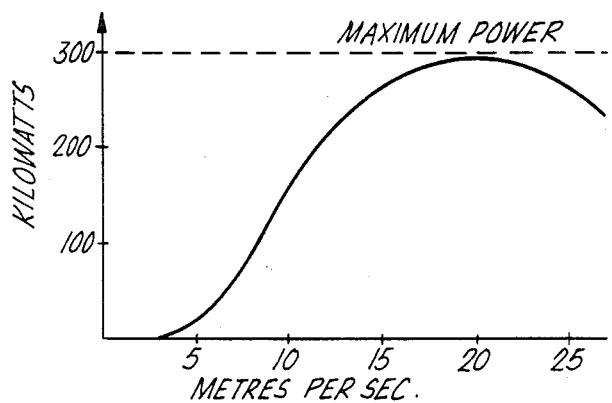
FIG. 2 is a similar graph of the characteristics of a stall regulated generator system.

FIG. 2 illustrates a similar arrangement in which the maximum power is, for example, designed to be 300 kilowatts and this can only be achieved, for example, when the wind speed reaches 20 meters per second. The normal operation will be at a speed of 10 to 15 meters per second and during this part of the operation there is no control of the speed or power. The maximum power is achieved in a zone in which there is a considerable amount of stall regulation, that is to say, where the wind speed is such as to cause the general efficiency of the rotor to decrease so that it is operating largely in a stall condition. Such an arrangement gives no control whatsoever during the normal operation and simply acts as an overspeed preventer.

The construction of the present invention, on the other hand, in which the power to wind speed curve is again illustrated in FIG. 3, has the system operating so that the generator is designed to operate within a given rotational speed range which is significantly below the speed at which the wind turbine can develop its maximum power. The actual maximum power which could be achieved is, as in FIG. 1, illustrated in chain dotted lines. Again, as in FIG. 1, there is a sharp cut-off which is brought about by the tips being twisted but this is achieved by centrifugal action on the tips themselves. It will be seen that there is not a constant speed (that is to say power also) over and above a particular rotational speed, but rather that the speed of rotation can increase slightly, say by 5% maximum.

Figure 3:
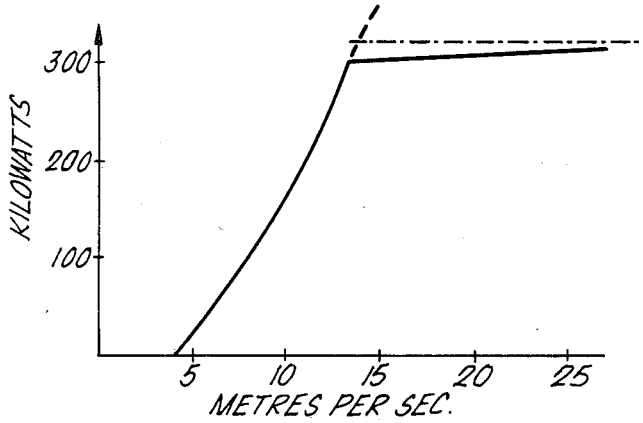
FIG. 3 is a graph of one embodiment of system according to the invention.

By way of comparison, FIG. 3 shows a horizontal dashed line corresponding to the horizontal power limit line illustrated in FIG. 1, to illustrate how, in the system according to the invention, the fluctuation in speed occurs within the upper portion of the speed range below the speed at which maximum power is reached.

Referring now to FIG. 4, there is illustrated in cross-section the end of a blade 10, provided with the relatively pivotal tip portion 12, the two being interconnected by a pin and socket arrangement, including a pin in the form of a tip tube 14 and a socket in the form of a main blade tube 16. The main blade tube has an access cover plate 18 covering an access opening 19 and a spring retaining block 20 is secured to the main blade tube by a tie rod 22. The end 15 of tip tube 14 is closed and there is located between this end plate 15 and the spring retaining block 20 a coil compression spring 24 surrounding the tie rod 22. The tip tube 14 is axially slidable in the main blade tube 16 and is urged radially inwardly, that is to the left as seen in the Figure by the action of the spring 24.

The tip tube 14 is provided in the portion encompassing the spring retaining block 20 with a track 26. This track includes a straight or radially extending portion 28 and a curved portion 30 so that the angle of inclination of this curved portion increases steadily as one moves to the right. A follower bearing pin 32 passes through the main blade tube 16, the guide track 26 and into the spring-retaining block. As the tip tube moves radially outwardly, that is to the right in the drawing, so it moves relative to the pin 32 which, in effect moves further to the left in the track 26. During initial movement to the right under centrifugal force on the tip 12, the pin 32 passes along the straight portion 58 of the track so that no twisting of the tip will occur but merely outward displacement against the action of the spring 24. This will increase the moment of inertia of the rotor and thereby slow it down initially. As the centrifugal force increases, due to an increase in speed, so the tip will move further to the right and the pin 32 will thus, in effect, move further to the left and thence into the curved portion 30 of the track 26, this bringing about a twisting action of the tip to slow the rotor down. In the drawing, the tip is shown in such a twisted condition. Normally there will be two bearing pins 32 and two guide tracks 26 on opposite sides.

I claim:

1. In a wind turbine operated electrical generator system, said system comprising a wind turbine of the axial flow type, blades of the turbine, tip portions of said blades each pivoted with respect to the remainder of the blade, a generator driven by the wind turbine and designed to operate within a given rotational speed range, said speed range being below the speed at which the wind turbine can develop its maximum power, a pin and socket connection on the outer end of at least some of said blades, for connecting the tip portion thereto, a cam track on the pin or socket, a cam follower on the socket or pin, respectively, and engaging in said cam track, the cam track being shaped to cause the tip to pivot under centrifugal movement of the tip, and resilient means to restore the position of said at least one tip against centrifugal action, the improvement consisting in that the characteristics of the resilient means and the cam track shape are designed to operate entirely within the upper portion of said speed range, to cause said system to operate always below the speed at which the turbine can produce its maximum power, to ensure that a change in the torque produced by pivoting of the tip, caused by centrifugal movement thereof causes a continuous fluctuation in the speed which is within said upper portion of the given range, thereby positively to control the power output of the system and in that means associated with said generator for accommodating said speed fluctuation.

2. A system according to claim 1, wherein the cam track is of a predetermined shape related to the blade tip aerofoil characteristics, so that a suitable opposing torque is produced to effect control at each level of high wind.

3. A system according to claim 2, wherein the first part of the cam track, in which the follower moves, extends in a direction generally radial of the axis of rotation, whereby the tip can move out easily in response to wind gusts.

4. A system according to claim 3, wherein the remainder of said cam track is curved with a steadily increasing angle of inclination to the radial direction.

5. A system according to claim 1, wherein said generator is an induction generator and constitutes said means for accommodating said fluctuation in speed.

6. A system according to claim 1, wherein said means for accommodating said fluctuations in speed comprise a fluid coupling.

* * * * *